3,359,225
CEMENT ADDITIVES CONTAINING POLYVINYL-PYRROLIDONE AND A CONDENSATE OF SODIUM NAPHTHALENE SULFONATE WITH FORMALDEHYDE
Charles F. Weisend, P.O. Box 17087,
Dallas, Tex. 75217
No Drawing. Filed Aug. 26, 1963, Ser. No. 304,669
10 Claims. (Cl. 260—29.6)

This invention relates to new and useful improvements in cement additives for Portland type cements and cement mixtures formulated therefrom.

The invention is directed in particular to an additive for Portland type cements which reduces the friction encountered as the cement mixture is flowed or pumped into place, and which also permits the utilization of decreased quantities of water in the cement mixture, thus appreciably increasing the strength of the hardened and cured cement.

In the art of drilling and completing wells, such as petroleum wells, water wells, and other types of wells, it is often desirable to cement the well casing in place in the well bore, and to this end, a cement slurry is pumped downwardly through the well bore, usually in a conductor within the well casing, out through the open lower end of the casing, and then upwardly around the casing between the outer wall of the casing and the wall of the well bore. In most instances, some type of drilling mud will have been employed in drilling the well bore, and accordingly, the wall of the latter will usually have thereon a cake of mud material which remains in place after the drilling has been completed. To obtain most effective cementing of the casing in the well bore, it is nearly always desirable that the cake of mud be scoured or loosened from the wall of the well bore and displaced by the cement slurry so that there will result a solid layer of hardened and cured cement between the casing and the earth formations through which the well bore passes, the cake of mud having been eliminated and removed from place. This scouring or removing of the mud cake from the wall of the well bore is obtained through achieving a desired degree of turbulence in the cement slurry as it flows upwardly in the annulus between the well casing and the wall of the well bore, and heretofore, certain minimum flow rates have been necessary to achieve the necessary velocities of flow in the annulus between the casing and the wall of the well bore, in order that the proper mud removal may take place, and the achieving of such flow rates has required the application of certain minimum pressures. The present invention, in reducing the frictional resistance set up in opposition to the flow of cement slurry permits the obtaining of the desired turbulent flow with lower flow rates and lower velocities in the annulus between the casing and the wall of the well bore, and accordingly, the application of decreased pump pressures to force the cement slurry into place in the desired manner.

It is therefore, a principal object of the invention to provide an improved cement additive for Portland type cements which reduces the resistance to flow of a cement slurry through conductors, annuli and the like.

Another principal object of the invention is to provide an improved additive for Portland type cements through the use of which turbulent flow of a cement slurry may be obtained at greatly reduced flow rates and velocities.

In addition, in the construction industry in general, it is desirable to increase the compressive strength of a hardened and cured cement, either to achieve a given strength with reduced cross-sectional areas, or to achieve greater strengths with a predetermined cross-sectional area.

Thus, an additional principal object of the invention is to provide an improved additive for Portland type cements which functions to prevent the separation of free water from a cement slurry, thus reducing water loss and thereby reducing the required initial water content of the slurry so that full hydration of the cement may take place with the utilization of less water, and hardened and cured cements of greater compressive strength obtained.

Other and more particular objects of the invention will be apparent from a reading of the following description.

As utilized herein, and in the examples hereinafter set forth, "cement additive" is employed to designate an additive formulated in accordance with this description and invention.

The cement additive of this invention comprises polyvinylpyrrolidone having an average molecular weight of the order of magnitude of 40,000, combined with the sodium salt of naphthalene sulfonate condensed with formaldehyde and having an average molecular weight of at least 1500, or of the magnitude of 1500. The polyvinylpyrrolidone is present in quantities of ½ to 10% by weight of the additive, the balance of the cement additive being essentially the sodium salt of naphthalene sulfonate condensed with formaldehyde, or the composition including 90 to 99.5% by weight of such sodium salt. The materials are merely mixed together and then may be added to the dry Portland type cement for thorough admixture therewith before incorporation into a cement mixture or slurry.

The stated sodium salt functions to reduce the friction encountered when the cement slurry is flowed or pumped into place, and as an example, permits the proper cementing of casing in a well bore utilizing greatly reduced pressures, flow rates and flow velocities while achieving the necessary turbulence to assure that the cement slurry moves fully and completely into the desired locations. Thus, where heretofore two or more pumps of a given size may have been required to force cement slurry into a well of certain characteristics, this being necessary in order to obtain the necessary pressures and flow rates, utilizing the cement additive of the present invention, only a single pump or pump truck may often be sufficient to obtain the desired placement of cement in a well of similar characteristics.

The polyvinylpyrrolidone prevents the separation of free water from the cement slurry, not just as a bulking material, but apparently through a protective colloid action, and accordingly, the water present in the slurry tends to be retained therein until full hydration of the Portland type cement has occurred. It is a basic rule of cement technology that greater compressive strengths are obtained when reduced quantities of water are utilized, and since the polyvinylpyrrolidone makes feasible the utilization of smaller initial quantities of water while achieving complete hydration, greater compressive strengths in the hardened and cured cement are obtained, and very sizable reduction in the initial water content of the slurry may be made. Thus, in a given cement slab of a certain preselected strength, thinner cross-sections may be utilized, or in the alternative, utilizing the same cross-sections, greater strengths may be obtained.

The cement additive may be added to the dry cement in the quantities of 0.1% to 3% by weight of the dry cement, less than 0.1% being more or less ineffective, and more than 3% being merely economically wasteful, and larger increases ultimately affecting the cement disadvantageously. The usual range of incorporation would be 0.3% to 1% by weight, and very effective results have been obtained by the utilization of 0.75% by weight of the cement additive based on the weight of the dry cement. After the additive has been incorporated thoroughly into the dry cement, the latter is handled in conventional fashions, being made up in the desired mix or slurry and handled thereafter in accordance with procedures well known to those skilled in this art.

The following specific examples illustrate the reduced flow rates and the reduced pressures of application which may be employed while obtaining the desired turbulence:

| Slurry Density, lbs./gal. | Volume of Water in cu. ft./sack | Velocity in Annulus, ft./sec. | Flow Rate, barrels/ minute | Friction Pressure, lbs./sq. inch 1,000 ft. | |
|---|---|---|---|---|---|
| | | | | Casing | Annulus |
| NEAT API CLASS A CEMENT | | | | | |
| 15.60 | 1.18 | 7.294 | 25.53 | 1,706 | 60 |
| API CLASS A CEMENT+0.75% CEMENT ADDITIVE | | | | | |
| 15.60 | 1.18 | 3.588 | 12.56 | 427 | 14 |
| 15.60 | 1.18 | 3.908 | 13.68 | 503 | 17 |
| 15.60 | 1.18 | 2.355 | 8.24 | 193 | 6 |
| NEAT API CLASS A CEMENT | | | | | |
| 15.60 | 1.18 | 7.175 | 25.12 | 1,653 | 58 |
| API CLASS A CEMENT+0.75% CEMENT ADDITIVE | | | | | |
| 15.60 | 1.18 | 2.105 | 7.37 | 156 | 5 |
| 15.60 | 1.18 | 2.674 | 9.36 | 246 | 8 |
| 15.60 | 1.18 | 2.095 | 7.33 | 154 | 5 |
| 15.60 | 1.18 | 2.230 | 7.81 | 173 | 6 |
| 15.60 | 1.18 | 2.254 | 7.89 | 177 | 6 |
| NEAT API CLASS A CEMENT | | | | | |
| 15.60 | 1.18 | 7.107 | 24.88 | 1,624 | 57 |
| API CLASS A CEMENT+0.75% CEMENT ADDITIVE | | | | | |
| 15.60 | 1.18 | 1.304 | 4.56 | 63 | 2 |
| 15.60 | 1.18 | 1.369 | 4.79 | 69 | 2 |
| 15.60 | 1.18 | 1.219 | 4.27 | 55 | 2 |
| 15.60 | 1.18 | 1.445 | 5.06 | 76 | 2 |
| 15.60 | 1.18 | 1.685 | 5.90 | 102 | 3 |
| 15.60 | 1.18 | 1.940 | 6.79 | 134 | 4 |
| 15.60 | 1.18 | 1.810 | 6.34 | 117 | 4 |
| 15.60 | 1.18 | 1.136 | 3.98 | 48 | 1 |
| NEAT API CLASS A CEMENT | | | | | |
| 15.60 | 1.18 | 7.060 | 24.71 | 1,604 | 56 |
| API CLASS A CEMENT+0.75% CEMENT ADDITIVE | | | | | |
| 15.60 | 1.18 | 2.018 | 7.06 | 144 | 5 |
| 15.60 | 1.18 | 1.908 | 6.68 | 129 | 4 |
| 15.60 | 1.18 | 1.601 | 5.60 | 92 | 3 |
| 15.60 | 1.18 | 2.116 | 7.41 | 157 | 5 |
| 15.60 | 1.18 | 1.906 | 6.67 | 130 | 4 |
| 15.60 | 1.18 | 2.488 | 8.71 | 213 | 7 |
| NEAT API CLASS A CEMENT | | | | | |
| 15.60 | 1.18 | 7.425 | 25.99 | 1,759 | 62 |
| API CLASS A CEMENT+0.75% CEMENT ADDITIVE | | | | | |
| 15.60 | 1.18 | 1.844 | 6.45 | 122 | 4 |
| 15.60 | 1.18 | 1.930 | 6.76 | 132 | 4 |
| 15.60 | 1.18 | 1.585 | 5.55 | 91 | 3 |
| 15.60 | 1.18 | 1.894 | 6.63 | 128 | 4 |
| 15.60 | 1.18 | 2.094 | 7.33 | 154 | 5 |
| 15.60 | 1.38 | 1.763 | 6.17 | 111 | 3 |
| 15.60 | 1.18 | 1.896 | 6.64 | 128 | 4 |
| NEAT API CLASS A CEMENT | | | | | |
| 15.60 | 1.18 | 7.123 | 24.93 | 1,630 | 57 |
| API CLASS A CEMENT+0.75% CEMENT ADDITIVE | | | | | |
| 15.60 | 1.18 | 1.856 | 6.50 | 122 | 4 |
| 15.60 | 1.18 | 1.458 | 5.10 | 77 | 2 |
| 15.60 | 1.18 | 1.423 | 4.98 | 74 | 2 |
| NEAT API CLASS A CEMENT | | | | | |
| 15.60 | 1.18 | 7.128 | 24.95 | 1,636 | 57 |
| API CLASS A CEMENT+0.75% CEMENT ADDITIVE | | | | | |
| 15.60 | 1.18 | 1.467 | 5.13 | 78 | 2 |
| 15.60 | 1.18 | 1.467 | 5.13 | 78 | 2 |
| 15.60 | 1.18 | 1.891 | 6.37 | 118 | 4 |
| 15.60 | 1.18 | 1.613 | 5.65 | 94 | 3 |
| 15.60 | 1.18 | 1.774 | 6.21 | 112 | 4 |
| 15.60 | 1.18 | 1.879 | 6.58 | 124 | 4 |
| 15.60 | 1.18 | 1.809 | 6.33 | 116 | 4 |
| NEAT API CLASS A CEMENT | | | | | |
| 15.60 | 1.18 | 6.784 | 23.75 | 1,494 | 52 |
| API CLASS A CEMENT+0.75% CEMENT ADDITIVE | | | | | |
| 15.60 | 1.18 | 2.549 | 8.92 | 224 | 7 |
| 15.60 | 1.18 | 1.775 | 6.21 | 112 | 4 |
| 15.60 | 1.18 | 1.764 | 6.17 | 111 | 3 |
| 15.60 | 1.18 | 1.874 | 6.56 | 125 | 4 |
| 15.60 | 1.18 | 1.585 | 5.55 | 91 | 3 |
| NEAT API CLASS A CEMENT | | | | | |
| 15.60 | 1.18 | 6.708 | 23.48 | 1,476 | 50 |
| API CLASS A CEMENT+0.75% CEMENT ADDITIVE | | | | | |
| 15.60 | 1.18 | 1.564 | 5.47 | 89 | 3 |
| 15.60 | 1.18 | 1.598 | 5.59 | 92 | 3 |
| 15.60 | 1.18 | 1.761 | 6.16 | 111 | 3 |
| 15.60 | 1.18 | 1.761 | 6.16 | 111 | 3 |
| 15.60 | 1.18 | 1.920 | 6.72 | 131 | 4 |
| 15.60 | 1.18 | 1.875 | 6.56 | 124 | 4 |
| 15.60 | 1.18 | 1.797 | 6.29 | 115 | 4 |
| NEAT API CLASS A CEMENT | | | | | |
| 15.60 | 1.18 | 6.694 | 23.43 | 1,467 | 50 |
| API CLASS A CEMENT+0.75% CEMENT ADDITIVE | | | | | |
| 15.60 | 1.18 | 1.739 | 6.09 | 109 | 3 |
| 15.60 | 1.18 | 1.232 | 4.31 | 56 | 2 |
| 15.60 | 1.18 | 1.402 | 4.91 | 72 | 2 |
| 15.60 | 1.18 | 1.256 | 4.40 | 58 | 2 |
| 15.60 | 1.18 | 1.691 | 5.92 | 102 | 3 |
| 15.60 | 1.18 | 1.698 | 5.94 | 103 | 3 |
| 15.60 | 1.18 | 1.906 | 6.67 | 129 | 4 |

The increased compressive strength of Portland type cements to which this cement additive has been added, are shown by the following examples showing flow rates and pressures for obtaining the desired turbulence:

| Percent by Wt. Cement Additive | Slurry Density, lbs./gal. | Volume of Water in cu./ft. sack | Velocity in Annulus, ft./sec. | Flow Rate, barrels/ minute | Friction Pressure lbs./sq. inch 1000 ft. | |
|---|---|---|---|---|---|---|
| | | | | | Casing | Annulus |
| API Class A Cement | | | | | | |
| 0.0 | 15.60 | 1.18 | 9.839 | 26.57 | 263 | 138 |
| 0.5 | 15.60 | 1.18 | 6.909 | 18.65 | 129 | 68 |
| 0.75 | 15.60 | 1.18 | 3.301 | 8.91 | 29 | 15 |
| API Class A Cement+4% Gel | | | | | | |
| 0.0 | 14.10 | 1.55 | 11.453 | 30.93 | 318 | 169 |
| 0.5 | 14.10 | 1.55 | 7.276 | 19.65 | 129 | 68 |
| 0.75 | 14.10 | 1.55 | 3.199 | 8.63 | 25 | 13 |
| 50-50 Pozmix A Cement+4% Gel | | | | | | |
| 0.0 | 14.10 | 1.26 | 9.843 | 26.58 | 236 | 124 |
| 0.5 | 14.10 | 1.26 | 4.138 | 11.17 | 42 | 22 |
| 0.75 | 14.10 | 1.26 | 1.537 | 3.66 | 4 | 2 |

The setting times and compressive strengths of the foregoing samples were as follows:

| Composition Cement Additive, Percent | Thickening Time, Hours:minutes | | API Compressive Strength, lbs./sq. inch 24 hours | | |
|---|---|---|---|---|---|
| | 6,000' Csq. | 8,000 'Csq. | 95° F. | 110° F. | 140° F. |
| API Class A Cement | | | | | |
| 0.0 | 2:16 | 1:08 | 1,405 | 2,375 | 5,200 |
| 0.5 | 1:55 | 1:23 | 1,795 | 2,350 | 5,285 |
| 0.75 | 2:12 | 1:55 | 1,810 | 2,775 | 4,660 |
| API Class A Cement+4% Gel | | | | | |
| 0.0 | 1:45 | 1:25 | 655 | 1,230 | 1,795 |
| 0.5 | 1:52 | 1:25 | 720 | 1,375 | 2,085 |
| 0.75 | 1:31 | 1:19 | 705 | 1,625 | 2,075 |
| 50-50 Pozmix A Cement+2% Gel | | | | | |
| 0.0 | 3:00+ | 2:14 | 465 | 800 | 1,240 |
| 0.4 | 3:31 | 1:46 | 445 | 725 | 1,335 |
| 0.75 | 3:00+ | 2:23 | 480 | 750 | 1,675 |

Of course, further reduction of initial water content of the slurry, barely sufficient to ensure hydration, will result in further increases in compressive strengths.

The foregoing description of the invention is explanatory thereof and various changes in the nature and percentages of the materials as well as in the details of the utilization thereof may be made within the scope of the appended claims without departing from the spirit of the invention.

What I claim and desire to secure by Letters Patent is:

1. A cement additive for Portland type cements comprising ½–10% by weight polyvinylpyrrolidone having an average molecular weight of the order of magnitude of 40,000, the balance of the additive being essentially the sodium salt of naphthalene sulfonate condensed with formaldehyde and having an average molecular weight of at least 1500.

2. A cement additive for Portland type cements comprising ½–10% by weight polyvinylpyrrolidone having an average molecular weight of the order of magnitude of 40,000 and 90–99.5% by weight the sodium salt of naphthalene sulfonate condensed with formaldehyde and having an average molecular weight of at least 1500.

3. A cement additive for Portland type cements comprising ½–10% by weight polyvinylpyrrolidone having an average molecular weight of the order of magnitude of 40,000, the balance of the additive being essentially the sodium salt of naphthalene sulfonate condensed with formaldehyde and having an average molecular weight of the order of magnitude of 1500.

4. A cement additive for Portland type cements comprising ½–10% by weight polyvinylpyrrolidone having an average molecular weight of the order of magnitude of 40,000, and 90–99.5% by weight the sodium salt of naphthalene sulfonate condensed with formaldehyde and having an average molecular weight of the order of magnitude of 1500.

5. A Portland type cement mixture comprising water, sufficient Portland type cement to form a pumpable slurry, and 0.1–3% by weight of an additive comprising ½–10% by weight polyvinylpyrrolidone having an average molecular weight of the order of magnitude of 40,000, the balance of the additive being essentially the sodium salt of naphthalene sulfonate condensed with formaldehyde and having an average molecular weight of at least 1500.

6. A Portland type cement mixture comprising water, sufficient Portland type cement to form a pumpable slurry, and 0.1–3% by weight of an additive comprising ½–10% by weight polyvinylpyrrolidone having an average molecular weight of the order of magnitude of 40,000, and 90–99.5% by weight the sodium salt of naphthalene sulfonate condensed with formaldehyde and having an average molecular weight of at least 1500.

7. A Portland type cement mixture comprising water, sufficient Portland type cement to form a pumpable slurry, and 0.1–3% by weight of an additive comprising ½–10% by weight polyvinylpyrrolidone having an average molecular weight of the order of magnitude of 40,000, the balance of the additive being essentially the sodium salt of naphthalene sulfonate condensed with formaldehyde and having an average molecular weight of the order of magnitude of 1500.

8. A Portland type cement mixture comprising water, sufficient Portland type cement to form a pumpable slurry, and 0.1–3% by weight of an additive comprising ½–10% by weight polyvinylpyrrolidone having an average molecular weight of the order of magnitude of 40,000, and 90–99.5% by weight the sodium salt of naphthalene sulfonate condensed with formaldehyde and having an average molecular weight of the order of magnitude of 1500.

9. A Portland type cement mixture comprising water, sufficient Portland type cement to form a pumpable slurry, and 0.1–1% by weight of an additive comprising ½–10% by weight polyvinylpyrrolidone having an average molecular weight of the order of magnitude of 40,000, the balance of the additive being essentially the sodium salt of naphthalene sulfonate condensed with formaldehyde and having an average molecular weight of at least 1500.

10. A Portland type cement mixture comprising water, sufficient Portland type cement to form a pumpable slurry, and approximately 0.75% by weight of an additive comprising ½–10% by weight polyvinylpyrrolidone having an average molecular weight of the order of magnitude of 40,000, the balance of the additive being essentially the sodium salt of naphthalene sulfonate condensed with formaldehyde and having an average molecular weight of at least 1500.

References Cited
UNITED STATES PATENTS
3,132,693 5/1964 Weisend _____ 260—29.6
3,140,269 7/1964 Wahl et al. _____ 260—29.6

GEORGE F. LESMES, *Primary Examiner.*

SAMUEL H. BLECH, *Examiner.*

PAUL LIEBERMAN, *Assistant Examiner.*